(12) United States Patent
Bell et al.

(10) Patent No.: US 9,122,605 B2
(45) Date of Patent: Sep. 1, 2015

(54) METHODS FOR DETERMINING MULTIPLE SIMULTANEOUS FAULT CONDITIONS

(71) Applicant: HONEYWELL INTERNATIONAL INC., Morristown, NJ (US)

(72) Inventors: Douglas Allen Bell, Peoria, AZ (US); Tim Felke, Glendale, AZ (US)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 66 days.

(21) Appl. No.: 14/034,217

(22) Filed: Sep. 23, 2013

(65) Prior Publication Data

US 2015/0089294 A1    Mar. 26, 2015

(51) Int. Cl.
*G06F 11/08*    (2006.01)
*G05B 23/02*    (2006.01)
*G06F 11/00*    (2006.01)
*G06F 11/07*    (2006.01)

(52) U.S. Cl.
CPC ........... *G06F 11/08* (2013.01); *G05B 23/02* (2013.01); *G06F 11/008* (2013.01); *G06F 11/0706* (2013.01); *G06F 11/079* (2013.01)

(58) Field of Classification Search
None
See application file for complete search history.

(56) References Cited

U.S. PATENT DOCUMENTS

| 4,656,474 | A  | * | 4/1987  | Mollier et al. ............... 713/181 |
| 5,081,626 | A  | * | 1/1992  | Scott ............................ 714/732 |
| 5,528,516 | A  |   | 6/1996  | Yemini et al. |
| 7,184,935 | B1 | * | 2/2007  | Cohen et al. .................. 702/186 |
| 8,175,846 | B2 |   | 5/2012  | Khalak et al. |
| 2007/0159882 | A1 | * | 7/2007 | Liardet et al. ............ 365/185.04 |
| 2010/0180168 | A1 | * | 7/2010 | Ward et al. .................... 714/726 |
| 2010/0262858 | A1 | * | 10/2010 | Chen et al. ....................... 714/2 |
| 2013/0251189 | A1 | * | 9/2013 | McMillan ..................... 382/100 |

FOREIGN PATENT DOCUMENTS

WO    2004090691 A2    10/2004
WO    2009097435 A1     8/2009

OTHER PUBLICATIONS

Steinder, M. et al.: "A survey of fault localization techniques in computer networks" Science of Computer Programming, vol. 53, Issue 2, pp. 165-194 (Elsevier, Nov. 2004).

(Continued)

*Primary Examiner* — Daniel McMahon
(74) *Attorney, Agent, or Firm* — Ingrassia Fisher & Lorenz, P.C.

(57) ABSTRACT

The present application relates to a method for determining multiple simultaneous fault conditions on complex systems. The method comprises receiving symptoms of a complex system from monitors. When some of the symptoms suggest the existence of multiple simultaneous fault conditions, then the method creates a symptom signature, creates one or more failure mode signatures, and creates an error code for each failure mode signature in regard to the symptom signature. Each failure mode signature is associated with only one failure mode. A Hamming distance is determined for each failure mode indicated as possibly causing the original fault condition. Each failure mode with the minimum Hamming distance and same Hamming Code are grouped together as being one of the multiple simultaneous fault conditions. All remaining failure modes with other Hamming distances are then assigned into one of the simultaneous fault conditions.

16 Claims, 3 Drawing Sheets

(56) References Cited

OTHER PUBLICATIONS

Stanley, G. "Compiled vs. First Principles Models" Greg Stanley and Associates—Operations Management Automation; retrieved from the Internet on Jul. 11, 2013, URL: http://gregstanleyandassociates.com/whitepapers/FaultDiagnosis/Compiled-Models/compiled-models.htm.

Weber P., Gentil S.: Fault detection and isolation using Multiple model parameter estimation. CESA'98 IMACS, Multiconference, Computational Engineering in Systems Applications, vol. 3, pp. 467-472, Nabeul-Hammamet, Tunisia, Apr. 1-4, 1998.

Luca Monacelli et al; ;Evolut'ion of the Codebook Technique for Automatic Fault Local i zati on , IEEE Communications Letters, IEEE Service Center, Piscataway, NJ, US, vol. 15, No. 4, Apr. 1, 2011.

EP Extended Search Report for Application No. 14183633.8 dated Feb. 26, 2015.

\* cited by examiner

US 9,122,605 B2

METHODS FOR DETERMINING MULTIPLE SIMULTANEOUS FAULT CONDITIONS

TECHNICAL FIELD

The subject matter herein relates generally to splitting fault conditions based on received evidence. Specifically, the subject matter relates to the use of Hamming Codes as error codes to determine how to split a fault condition into two or more trackable fault conditions.

BACKGROUND

In preventive maintenance and mission planning, it is important to calculate the likelihood of failures in a monitored system as symptoms (i.e., evidence) are observed. Since many failures frequently have overlapping evidence, it is often the case that ambiguity in fault reasoning will exist when trying to find the root cause failure.

In some currently available health management systems, all the evidence is collected in a single database and it is assumed that there is only one failure. In some cases, however, there are two or more failures in a monitored system. In this case, the health management system will still only indicate a single failure although conflated or indeterminate.

Other currently available health management systems allow for any number of faults, however the computation is exponentially expensive. Alternative fault condition splitting rubrics require an inordinate amount of computing power and computing overhead. Thus, it is desirable to split simultaneous occurring faults into their individual fault conditions while reducing the computing overhead necessary to do so.

SUMMARY

A method is provided for determining multiple simultaneous fault conditions on complex systems. The method comprises receiving symptoms of a complex system from monitors connected in a many-to-many relationship to multiple failure modes. When some of the symptoms suggest the existence of multiple simultaneous fault conditions, then the method maps the existence of each received symptom to an associated position in a first bit array to create a symptom signature, maps the existence of each symptom received to an associated position in each bit array of a plurality of additional bit arrays thereby creating one or more failure mode signatures, and creates an error code for each failure mode signature in regard to the symptom signature. Each failure mode signature is associated with only one failure mode. A Hamming distance is then determined between the error code and the failure mode signature for each failure mode indicated as possibly causing the original fault condition. Each failure mode with the same Error code is grouped together as being one of the multiple simultaneous fault conditions. All remaining failure modes with other Hamming distances are assigned into one of the newly determined simultaneous fault conditions.

A non-transient computer readable medium is provided containing instructions that when executed on a processor performs the acts of receiving symptoms of a complex system from monitors connected in a many-to-many relationship to multiple failure modes. When some of the symptoms suggest the existence of multiple simultaneous fault conditions, then the method maps the existence of each received symptom to an associated position in a first bit array to create a symptom signature, maps the existence of each symptom received to an associated position in each bit array of a plurality of additional bit arrays thereby creating one or more failure mode signatures and create an error code for each failure mode signature in regard to the symptom signature. Each failure mode signature being associated with only one failure mode. A Hamming distance is then determined between the error code and the failure mode signature for each failure mode indicated as possibly causing the original fault condition. Each failure mode with the same Hamming distance is grouped together as being one of the multiple simultaneous fault conditions. All remaining failure modes with other Hamming distances are assigned into one of the simultaneous fault conditions.

A system for determining multiple simultaneous fault conditions on complex systems is provided that comprises a plurality of sensors generating symptoms, a memory device containing a reference model of the complex system, and a processor. The processor is configured to receive symptoms of a complex system from monitors connected in a many-to-many relationship to multiple failure modes. When some of the symptoms suggest the existence of multiple simultaneous fault conditions, then the method maps the existence of each received symptom to an associated position in a first bit array to create a symptom signature, maps the existence of each symptom received to an associated position in each bit array of a plurality of additional bit arrays thereby creating one or more failure mode signatures and creates an error code for each failure mode signature in regard to the symptom signature. Each failure mode signature is associated with only one failure mode. A Hamming distance is then determined between the error code and the failure mode signature for each failure mode indicated as possibly causing the original fault condition. Each failure mode with the same Hamming distance is grouped together as being one of the multiple simultaneous fault conditions. All remaining failure modes with other Hamming distances are assigned into one of the simultaneous fault conditions.

DRAWINGS

FIG. 2 is a graphical depiction of an exemplary fault condition comprising a set of failure modes indicated by symptoms; and.

In accordance with common practice, the various described features are not drawn to scale but are drawn to emphasize features relevant to the present invention. Like reference characters denote like elements throughout figures and text.

DETAILED DESCRIPTION

Figure 1:
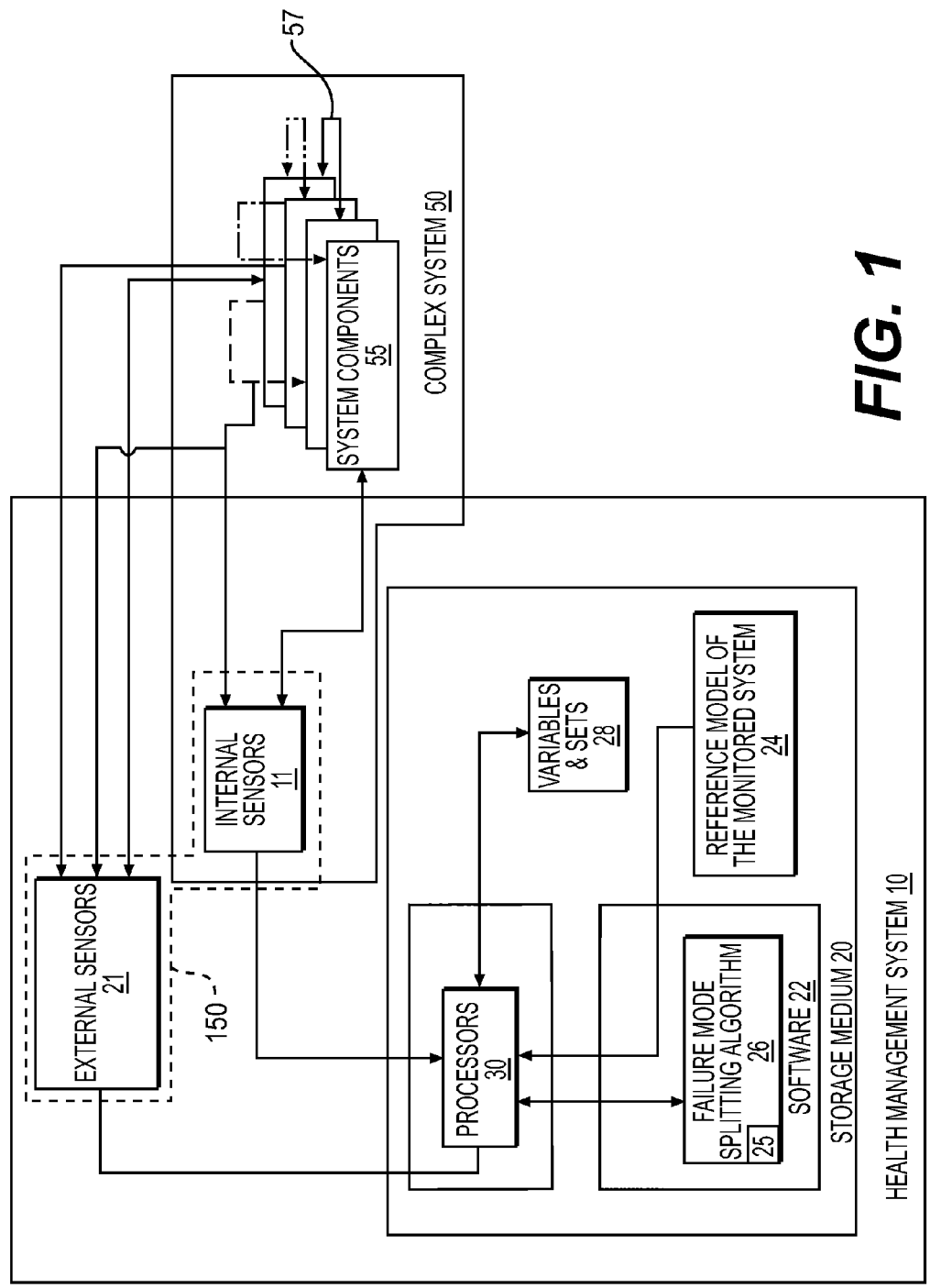
FIG. 1 is a functional block diagram of an exemplary embodiment of a health management system and a monitored complex system in accordance with the subject matter disclosed herein.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Those of skill in the art will appreciate that the various illustrative logical blocks, modules, circuits, and algorithm steps described in connection with the embodiments disclosed herein may be implemented as electronic hardware, computer software executing on hardware, or combinations of both. Some of the embodiments and implementations are described above in terms of functional and/or logical block components (or modules) and various processing steps. However, it should be appreciated that such block components (or modules) may be realized by any number of hardware, software executing on hardware, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

In preventive maintenance and mission planning, it is important to calculate the likelihood of particular failures in the monitored system when symptoms (evidence) are observed. Since many failures frequently have overlapping evidence, there is often ambiguity in fault reasoning when trying to find the root cause of the failure. Various methods for the determination of the likelihood of failures may be found in co-owned U.S. Pat. No. 8,095,377 to Kolbet and U.S. Pat. No. 8,224,765 to Khalak, both of which are incorporated herein by reference in their entireties.

FIG. 1 is a block diagram of one exemplary embodiment of a health management system 10 monitoring a complex system 50 in accordance with the present invention. Those skilled the art may choose an equivalent arrangement or architecture as may suit their specific needs without departing from the scope of this disclosure.

The complex system 50 includes at least one system component 55, and internal sensors 11. The health management system 10 includes sensors represented generally at 150, at least one processor 30, and a storage medium 20 to store software 22 executable by the at least one processor 30. The sensors 150 include both the internal sensors 11 in the monitored complex system 50, and external sensors 21, which are external to the monitored complex system 50. The health management system 10 is configured to determine relative probabilities of failure in the monitored complex system 50. The at least one processor 30 is referred to herein as the processors 30. The sensors 150, internal sensors 11, and external sensors 21 are also referred to herein as monitors 150, internal monitors 11, and external monitors 21, respectively.

Some of the system components 55 are connected to others of the system components 55 via connections represented generally at 57. The connections can be wired or wireless. The sensors 150 are communicatively coupled to the system components 55 to monitor the system components 55. Likewise, the sensors 150 are communicatively coupled to each of the connections 57 between the various system components 55 to monitor the linking between two system components. In one implementation of this embodiment, the sensors 150 also monitor the environment of the monitored system complex system 50.

The sensors 150 are communicatively coupled to output, to the processors 30, evidence observations that are generated during the monitoring. The processors 30 receive the evidence observations from the sensors 150. The processors 30 generate an array of failure modes that form an ambiguity group of failure modes associated with a fault condition based on the evidence observations received from the sensors 150. The processors 30 also execute algorithms in the software 22 to generate information regarding unknown causes of failures.

The software 22 stored in the storage medium 20 includes a fault condition splitting algorithm 26. The fault condition splitting algorithm 26 includes a Hamming distance module 25. A reference model 24 of the monitored complex system 50 is stored in the storage medium 20. In one implementation of this embodiment, the storage medium also stores variables, bit arrays, and sets 28 generated by the processor(s) 30.

In some embodiments, the monitored complex system 50 is an aircraft. In other embodiments, the monitored system is a land vehicle, watercraft or stationary plant. The processors 30 execute software 22 and/or firmware that causes the processors 30 to perform at least some of the processing described here as being performed by the health management system 10. At least a portion of such software 22 and/or firmware that is executed by the processors 30 and any related data structures are stored in storage medium 20 during execution. In one implementation of this embodiment, the processors 30 include a memory (not shown) that comprises any suitable memory now known or later developed such as, for example, random access memory (RAM), read only memory (ROM), and/or registers within the processors 30. In one implementation, the processors 30 comprise microprocessors or microcontrollers. The software 22 and/or firmware executed by the processors 30 comprises a plurality of program instructions that are stored or otherwise embodied on a storage medium 20 from which at least a portion of such program instructions are read for execution by the processor(s) 30. In some embodiments, the processors 30 comprise processor support chips and/or system support chips such as application-specific integrated circuits (ASICs).

The fault condition splitting algorithm 26 described herein computes whether a multiple failure situation exists, given evidence observations. The fault condition splitting algorithm described herein solves a binary many-to-many probabilistic fault isolation problem in which many elements of evidence fail to indict a failure mode of a fault condition because a single fault assumption conventionally used in the art does not apply.

The fault condition splitting algorithm 26 uses Hamming Codes in a rigorous manner to resolve two primary complications of the fault condition determination task. First, fault condition splitting algorithm 26 resolves a situation in which there are some elements of evidence that suggest the same failure mode, but some of the elements are disagreeing, indicating that the single fault assumption is invalid. Second, the algorithm is used to determine which failure modes are associated upon the isolation of multiple simultaneous fault conditions. Hamming Codes are well known in the art for use in computer code message error detection and resolution where one bit array received may have one or more errors from the original code sent. Hamming codes are used here in as "error codes."

Typically, a single fault assumption is utilized when a fault occurs. However, when the evidence suggests that more than one failure is being detected or tracked (i.e., the single fault assumption fails) the set of failure modes associated with an initial fault condition are split into two groups (or, islands of single fault assumption) in which it is assumed that each new fault condition created has only one active fault. In this manner, single fault reasoning is implemented to track more than one fault. The use of single fault reasoning (i.e., the failure-mode-relative-likelihood algorithm) keeps the computation and computation costs down. This bifurcation is called "fault condition splitting," or fault splitting."

The problem of fault condition determination or "splitting" is divided into two steps for purposes of explanation. Failure modes are analyzed to determine if they should be split in order to maintain the single fault assumption; and two new fault conditions are created from the failure modes of the initial fault condition. These steps are repeated until each subset of failure modes (i.e., new fault conditions) is tracking a single fault. Thus, if there are two or more failure modes that are not consistent with a single fault, the procedure is performed iteratively until each actual failure mode is identified and categorized as tracking a single fault such that the single fault assumption is again valid for each new fault condition.

The fault condition splitting algorithm 26 determines whether the single fault hypothesis fails and then identifies the multiple failure modes. The term "failure mode" is a logical structure that represents a specific physical way in which a 'monitored asset' can fail. A "monitored asset" herein means a part, or a connection between parts, of a complex system. A "fault condition" is defined as a logical structure that includes all physical failure modes considered to be of significance when a component or a connection between components of a complex system being monitored fails.

More specifically, the fault condition is an array of failure modes that form an ambiguity group of failure modes. The relationship between failure modes and fault sensors is based on manufacturing data. Non-limiting examples of manufacturing data include schematics, Failure mode and effects analysis (FMEA), and real world operational experience such as schematics FMEA The manufacturing data is used to define the false alarm rate and the detection probability, which are then gradually built up over time by an implementation of a learning loop that updates the fault conditions for a hidden factor matrix.

If an instance of a fault condition has received no new evidence of a failure (i.e., a "symptom"), there is no need to split the fault condition. However, when new evidence of a failure mode is received, the fault condition splitting algorithm determines whether or not the fault condition should be split (i.e., the single failure assumption fails) by calculating a Hamming Distance and an Hamming Code (i.e., Error Code) to determine a "symptom signature". A "symptom signature" as used herein is a binary bit array that indicates the degree to which predetermined symptoms that have been manifested within the complex system correlate to each possible failure mode of a complex system.

Figure 2:
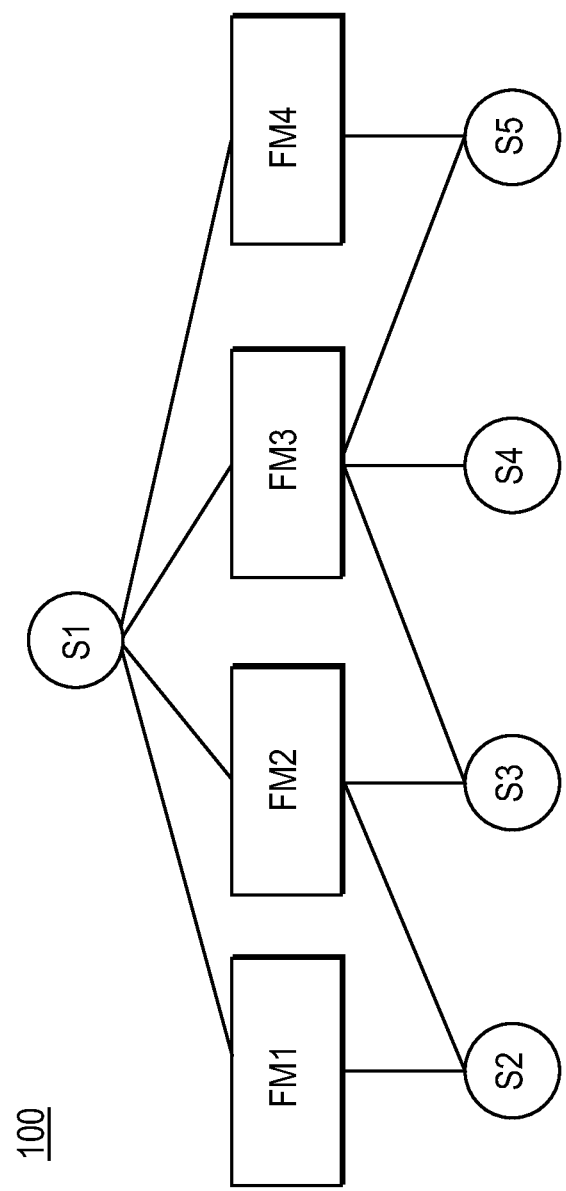

As an example of the failure of the "single failure assumption," (See, FIG. 2) a fault condition 100 may comprise multiple probable failure modes (FM1-FM4) where a first symptom (S1) is indicative (or indicts) all four failure modes (i.e., a fault condition ambiguity set). When a second symptom (S2) is detected, the second symptom indicts only FM1 and FM2 and rules out FM3 and FM4. However, if a third symptom (S5) is detected, and the third symptom does not indict FM1 or FM2, then the single failure mode assumption is not valid and the fault condition must be split into two or more distinct fault conditions. Which fault conditions those would be is determined by calculating Hamming Codes and Hamming distances.

A Hamming distance measures the degree to which the symptom signature (i.e., the combination of symptoms) correlates to each of the failure modes in the fault condition. Table 1 provides a conventional example of a Hamming distance that is used to check bit arrays. In Table 1, the Hamming distance between bit arrays A and B is the number of corresponding bit positions that differ. This can be found by applying an "exclusive OR" function to corresponding bits or by adding corresponding bits without carry. Thus, the Hamming distance between

TABLE 1

| A | 0 1 0 0 1 0 1 0 0 0 |
|---|---|
| B | 1 1 0 1 0 1 0 1 0 0 |
| A XOR B = | 1 0 0 1 1 1 1 1 0 0 | bit sting A and bit array B is equal to 6, which is the number of 1's in the XOR array.

Figure 3:
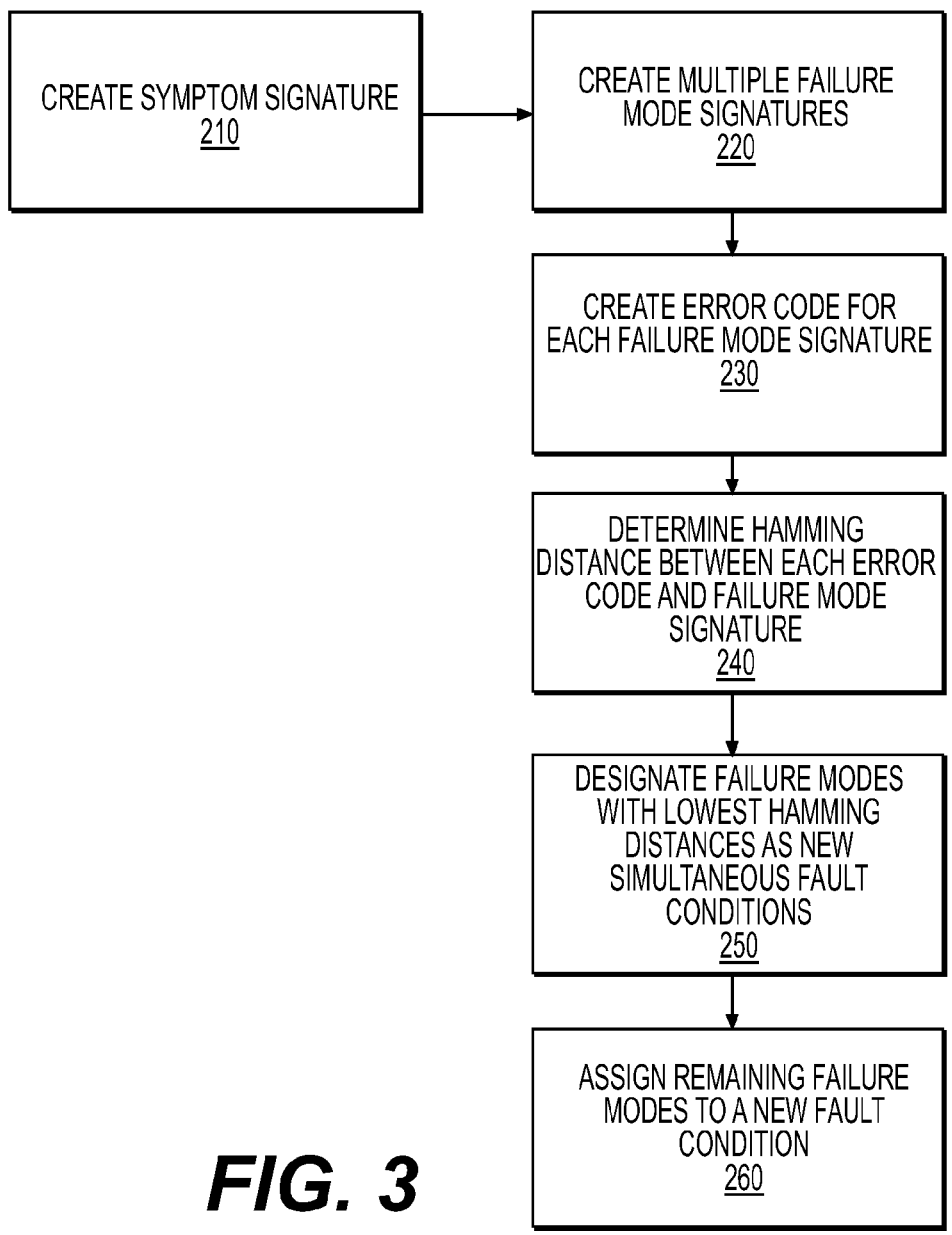
FIG. 3 is a flow diagram of an exemplary logic flow diagram for splitting a fault condition according to embodiments.

FIG. 3 is a logic flow diagram of a method 200 for determining split failure modes for a fault condition where a fault cannot be identified from the totality of observed symptoms because the conventional single fault model assumptions fail. The method 200 uses Hamming Codes as Error Codes.

To use a Hamming Code as an Error Code in regard to a fault condition application, a fault signature template (i.e., a bit array) is created by mapping each symptom to a bit position in process 210. Thus, the fault signature template associated with FIG. 2 comprises five (5) bits with symptoms S1-S5 mapped to bit positions 1 to 5 in a bit array, respectively. Because symptoms S1, S2 and S5 are detected, the "symptom signature" is 11001. This is so because a "1" is placed in the symptom's position in the bit array.

Similarly, at process 220, a "failure mode signature" is created for each failure mode (FM) based on the symptoms received from the complex system that are known from experience, analysis and experimentation to indict that failure mode. A "failure mode signature" as used herein is a set of known symptoms that can be produced by a Failure Mode and is indicative thereof. A failure mode signature may be represented as a binary bit array that is similar in format to a symptom signature.

For example, in FIG. 1 the failure mode signature for FM1 would be 11000 because symptoms S1 and S2 each indict FM1 and the rest do not. Creating failure mode signatures in the same fashion for the remaining failure modes results in the following:
  FM1=11000
  FM2=11100
  FM3=10111
  FM4=10001.

At process 230, an "error code" is created for each failure mode signature in relationship to the symptom signature determined in process 210. An "error code" is defined herein as the logical "exclusive or" (XOR) between a failure mode signature and the symptom signature. For example, the symptom signature from process 210 is 11001, and the failure mode signature for FM1 from process 220 is 11000. Thus, the resulting XOR array is 00001 because only the furthest right hand digit in both signatures is different. Creating error codes in the same fashion for the remaining failure modes results in the following:
  EC1=00001
  EC2=00101
  EC3=10111
  EC4=10001.

At process 240, the Hamming distance is determined from the error code for each failure mode. For example, the error code for FM1 has only a single "1" in its array. As such, the Hamming distance for FM1 is "1." Expanding process 240 to all of the Failure Modes (FM1-FM4) results in the following Table 2. As may be seen in Table 2, FM1 and FM4 both have the lowest Hamming distances or, have Hamming distances that are below a user defined minimum Hamming distance. Hence, the two most likely failure modes (i.e., "primary failure modes") that may be causing the symptoms represented by the symptom signature are FM1 and FM4. FM1 and FM4 can now be considered to be "fault conditions" unto themselves (FC1 and FC4). In this simplified example, it is assumed the minimum Hamming distance is "1." However, the minimum Hamming

TABLE 2

| Symptom 11001 | Signature | Error Code | Hamming Distance | Hexadecimal Error Code |
|---|---|---|---|---|
| FM1 | 11000 | 00001 | 1 | 01 |
| FM2 | 11100 | 00101 | 2 | 05 |
| FM3 | 10111 | 01110 | 3 | 0E |
| FM4 | 10001 | 01000 | 1 | 08 | distance for analysis purposes may be set at any desired level by a technician such that other failure modes with higher Hamming distances may be further considered.

For failure modes that have a Hamming distance that is greater than the minimum Hamming distance, the error code can also be used to determine which of the newly identified fault conditions (FC1, FC4) the remaining failure modes should be assigned. At process 250, the error codes of the remaining failure modes FM2 and FM3 are compared to the error codes of the new fault conditions FC1 and FC4 (See, Table 3). The failure modes with the greatest number of error code bits in common

TABLE 3

| Error Symptom | FC1 00001 | FC4 01000 |
|---|---|---|
| FM2 00101 | 00100 | 00000 |
| FM3 01110 | 00000 | 00100 | are then associated. In the continuing example, Table 3 indicates that FM2 and FC1 have one error code bit in common and FM2 and FC4 have none. The converse is true of FM3. Hence, FM3 may be considered a failure mode of FC4 and FM2 may be considered a failure mode of FC1.

A slightly more complicated example for purpose of explanation of process 250 is provided in Table 4. Once all failure modes from Table 4 with a common error code and a Hamming distance that is below a minimum Hamming distance

TABLE 4

| | FM signature | Error Code | Hamming Distance | Hexadecimal Error Code |
|---|---|---|---|---|
| FM1 | 1010 | 1100 | 2 | 0C |
| FM2 | 0101 | 0011 | 2 | 03 |
| FM3 | 0010 | 0100 | 1 | 04 |
| FM4 | 0100 | 0010 | 1 | 02 |
| FM5 | 0100 | 0010 | 1 | 02 |
| FM6 | 0010 | 0100 | 1 | 04 |
| FM7 | 1100 | 1010 | 2 | 0A |
| FM8 | 0011 | 0101 | 2 | 05 |
| FM9 | 0010 | 0100 | 1 | 04 |
| FM10 | 0100 | 0010 | 1 | 02 | are placed in the same fault condition, the remaining secondary failure modes listed in Table 5 are allocated at process 260. In this example Error Code 0100 includes (FM3, FM6, FM9). Error Code 0010 includes (FM4, FM5 and FM10). Table 5 shows the remaining unallocated failure modes.

TABLE 5

| FM signature | Error Code | Hamming Distance | Hexadecimal Error Code |
|---|---|---|---|
| FM1 | 1010 | 1100 | 2 | 0C |
| FM2 | 0101 | 0011 | 2 | 3 |
| FM7 | 1100 | 1010 | 2 | 0A |
| FM8 | 0011 | 0101 | 2 | 5 |

Of the remaining Failure modes, the signatures for FM1 and FM8 have a difference of a single digit with error code 0100, so FM1 and FM8 join (FM3, FM6, FM9). FM2 and FM7 have a 1 digit difference with error code 0010, so FM2 and FM7 join (FM4, FM5, FM10).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

We claim:

1. A method for determining multiple simultaneous fault conditions occurring on complex systems comprising:
   providing a plurality of failure mode signatures, each failure signature indicative of a corresponding failure mode in a plurality of failure modes;
   receiving symptoms of a complex system from monitors;
   when the received symptoms are indicative of multiple simultaneous fault conditions, then:
   mapping each of the received symptoms to a position in an array to define a symptom signature;
   calculating an error code for each of the plurality of failure modes using the plurality of failure mode signatures and the symptom signature;
   determining a Hamming distance for each of the plurality of failure modes from the calculated error codes;
   identifying failure modes in the plurality of failure modes that have a lowest Hamming distance;
   grouping the identified failure modes with the lowest Hamming distance into a plurality of simultaneous fault conditions such that identified failure modes with the lowest Hamming distance and having a same error code are grouped together in a same fault condition; and
   assigning all remaining failure modes in the plurality of failure modes with other Hamming distances into one of a plurality simultaneous fault conditions.

2. The method of claim 1, wherein the calculating the error code for each of the plurality of failure modes using the plurality of failure mode signatures and the symptom signature comprises performing exclusive or (XOR) operations on the symptom signature and each of the plurality of the failure mode signatures.

3. The method of claim 1, wherein the assigning all of the remaining failure modes in the plurality of failure modes comprises comparing error codes of the remaining failure modes to error codes of the identified failure modes with the lowest Hamming distance previously grouped into the plurality of simultaneous fault conditions.

4. The method of claim 3, wherein the comparing the error codes of the remaining failure modes to the error codes of the identified failure modes comprises determining the Hamming distance between the error codes of the remaining failure modes to the error codes of the identified failure modes with the lowest Hamming distance previously grouped into the plurality of simultaneous fault conditions.

5. The method of claim 4, wherein the assigning all the remaining failure modes in the plurality of failure modes comprises assigning each of the remaining failure modes to a simultaneous fault condition with the lowest determined Hamming distance between the error code of the remaining failure modes to the error code of the identified failure modes previously grouped in the simultaneous fault condition.

6. The method of claim 1, wherein each failure mode signature comprises a bit array, with each position in the bit array corresponding to one of the symptoms received from the monitors.

7. A non-transient computer readable medium containing instructions that when executed on a processor performs acts of:
   providing a plurality of failure mode signatures, each failure signature indicative of a corresponding failure mode in a plurality of failure modes;
   receiving symptoms of a complex system from monitors;
   when the received symptoms are indicative of multiple simultaneous fault conditions, then:
   mapping each of the received symptoms to an associated position in a first bit array to create a symptom signature;
   creating an error code for each of the plurality of failure modes using the plurality of failure mode signatures and the symptom signature;
   determining a Hamming distance for each of the plurality of failure modes from the created error codes;
   identifying failure modes in the plurality of failure modes that have a lowest Hamming distance;
   grouping the identified failure modes with the lowest Hamming distance into a plurality of simultaneous fault conditions such that identified failure modes with the lowest Hamming distance and having a same error code are grouped together in a same fault condition; and
   assigning all remaining failure modes in the plurality of failure modes with other Hamming distances into one of the simultaneous fault conditions.

8. The non-transient computer readable medium of claim 7, wherein the creating the error code for each of the plurality of failure modes using the plurality of failure mode signatures and the symptom signature comprises performing exclusive or (XCOR) operations on the symptom signature and each of the plurality of the failure mode signatures.

9. The non-transient computer readable medium of claim 7, wherein the assigning all of the remaining failure modes in the plurality of failure modes comprises comparing error codes of the remaining failure modes to the error codes of the identified failure modes with the lowest Hamming distance previously grouped into the plurality of simultaneous fault conditions.

10. The non-transient computer readable medium of claim 9, wherein the comparing the error codes of the remaining failure modes to the error codes of the identified failure modes comprises determining the Hamming distance between the error codes of the remaining failure modes to the error codes of the identified failure modes with the lowest Hamming distance previously grouped into the plurality of simultaneous fault conditions.

11. The non-transient computer readable medium of claim 10, wherein the assigning all the remaining failure modes in the plurality of failure modes comprises assigning each of the remaining failure modes to a simultaneous fault condition with the lowest determined Hamming distance between the error codes of the remaining failure modes to the error codes of the identified failure modes with the lowest Hamming distance previously grouped into the plurality of simultaneous fault conditions.

12. A system for determining multiple simultaneous fault conditions on complex systems comprising:
- a plurality of sensors generating symptoms;
- a memory device containing a reference model of the complex system; and
- a processor configured to:
  - receive symptoms of a complex system from monitors connected in a many-to-many relationship;
  - provide a plurality of failure mode signatures, each failure signature indicative of a corresponding failure mode in a plurality of failure modes;
  - when the received symptoms are indicative of existence of multiple simultaneous fault conditions, then:
  - map each of the received symptoms to an associated position in a first bit array to create a symptom signature;
  - create an error code for each of the plurality of failure modes using the plurality of failure mode signatures and the symptom signature;
  - determine a Hamming distance for each of the plurality of failure modes from the created error codes;
  - identify failure modes in the plurality of failure modes that have a lowest Hamming distance;
  - group the identified failure modes with the lowest Hamming distance into a plurality of simultaneous fault conditions such that identified failure modes with the lowest Hamming distance and having a same error code are grouped together in a same fault condition; and
  - assign all remaining failure modes in the plurality of failure modes with other Hamming distances into one of a plurality simultaneous fault conditions.

13. The system of claim 12, wherein the processor is further configured to create the error code for each of the plurality of failure modes using the plurality of failure mode signatures and the symptom signature by performing exclusive or operations on the symptom signature and each of the plurality of the failure mode signatures.

14. The system of claim 12, wherein the processor is further configured to assign all remaining failure modes in the plurality of failure modes by comparing error codes of the remaining failure modes to error codes of the identified failure modes with the lowest Hamming distance previously grouped into the plurality of simultaneous fault conditions.

15. The system of claim 14, wherein the processor is further configured to compare the error codes of the remaining failure modes to the error codes of the identified failure modes by determining the Hamming distance between the error codes of the remaining failure modes to the error codes of the identified failure modes with the lowest Hamming distance previously grouped into the plurality of simultaneous fault conditions.

16. The system of claim 15, the processor is configured to assign all remaining failure modes in the plurality of failure modes with other Hamming distances into one of a plurality simultaneous fault conditions by assigning each of the remaining failure modes to a simultaneous fault condition with the lowest determined Hamming distance between the error code of the remaining failure modes to the error code of the identified failure modes previously grouped in the simultaneous fault condition.

* * * * *

UNITED STATES PATENT AND TRADEMARK OFFICE
CERTIFICATE OF CORRECTION

PATENT NO.         : 9,122,605 B2                                   Page 1 of 1
APPLICATION NO.    : 14/034217
DATED              : September 1, 2015
INVENTOR(S)        : Bell et al.

It is certified that error appears in the above-identified patent and that said Letters Patent is hereby corrected as shown below:

In the Claims

Column 10, line 46, "XCOR" should be changed to --XOR--.

Signed and Sealed this
Third Day of May, 2016

Michelle K. Lee
*Director of the United States Patent and Trademark Office*